US006359466B1

(12) United States Patent
Sharpe-Geisler (10) Patent No.: US 6,359,466 B1
(45) Date of Patent: Mar. 19, 2002

(54) CIRCUITRY TO PROVIDE FAST CARRY

(75) Inventor: Bradley A. Sharpe-Geisler, San Jose, CA (US)

(73) Assignee: Vantis Corporation, Sunnyvale, CA (US)

( * ) Notice: Subject to any disclaimer, the term of this patent is extended or adjusted under 35 U.S.C. 154(b) by 0 days.

(21) Appl. No.: 08/931,798

(22) Filed: Sep. 16, 1997

(51) Int. Cl.[7] .......................... H03K 19/173; G06F 7/38
(52) U.S. Cl. .......................... 326/37; 326/39; 326/40; 326/41; 326/113
(58) Field of Search .......................... 326/37, 39–41, 326/113

(56) References Cited

U.S. PATENT DOCUMENTS

| 5,162,666 | A | * | 11/1992 | Tran | 327/408 |
|---|---|---|---|---|---|
| 5,260,881 | A | | 11/1993 | Agrawal et al. | 364/489 |
| 5,349,250 | A | * | 9/1994 | New | 326/39 |
| 5,386,156 | A | * | 1/1995 | Britton et al. | 326/37 |
| 5,430,390 | A | * | 7/1995 | Chan et al. | 326/39 |
| 5,631,576 | A | * | 5/1997 | Lee et al. | 326/39 |
| 5,955,912 | A | * | 9/1999 | Ko | 327/410 |
| 6,014,038 | A | * | 1/2000 | How et al. | 326/46 |

* cited by examiner

Primary Examiner—Michael Tokar
Assistant Examiner—Steven S. Paik
(74) Attorney, Agent, or Firm—Fliersler Dubb Meyer & Lovejoy LLP (57) ABSTRACT

A circuit for providing a carry operation utilizing 3-input look up tables 502 and 504 and subsequent logic, the circuitry being configurable to provide an adder, a subtractor, an up/down counter, a pre-loadable counter, an accumulator, and a wide gate such as a large AND gate. To provide a carry out $C_{i+1}$, a multiplexer 506 has a first input receiving a carry in $C_i$, a select input coupled to the output of look up table 502, and a second input coupled to the output of look up table 504. The look up tables receive signals representing numbers $A_i$ and $B_i$ to be added or subtracted and ADD/SUB indicating if addition or subtraction is desired. The look up table 502 is programmed to provide $A_i(+)B_i$, while look up table 504 is programmed to provide $A_i*B_i$, (+) indicating a Boolean exclusive OR, and * a Boolean AND. With ADD selected, multiplexer 506 provides the carry out $C_{i+1}$ of the operation $A_i+B_i+C_i$. With SUB selected, a 2's complement of B is done before adding in the look up tables. The carry provided by multiplexer 506 is buffered by only one inverter. To provide a result of an addition or subtraction operation, $S_i$, a multiplexer 508 has a first input receiving $C_i$, a second input receiving the inverse of $C_i$, and a select input receiving the output of look up table 502. An up/down counter, an accumulator and a preloadable counter can be formed by registering each $S_i$ output back to its corresponding $A_i$ input. Additional components (510, 514, 516, 518) can be included to provide wide gating.

23 Claims, 5 Drawing Sheets

| $A_i$ | $B_i$ | $C_i$ | $C_{i+1}$ | |
|---|---|---|---|---|
| 0 | 0 | 0 | 0 | ⎫ $A_i=B_i$, $C_{i+1}=A_i$ |
| 0 | 0 | 1 | 0 | ⎭ |
| 0 | 1 | 0 | 0 | ⎫ |
| 0 | 1 | 1 | 1 | ⎬ $A_i \neq B_i$, $C_{i+1}=C_i$ |
| 1 | 0 | 0 | 0 | ⎪ |
| 1 | 0 | 1 | 1 | ⎭ |
| 1 | 1 | 0 | 1 | ⎫ $A_i=B_i$, $C_{i+1}=A_i$ |
| 1 | 1 | 1 | 1 | ⎭ |

CIRCUITRY TO PROVIDE FAST CARRY

BACKGROUND OF THE INVENTION

1. Field of the Invention

The present invention relates to a circuit for providing a carry for a circuit performing an addition or subtraction operation. More particularly, the present invention relates to a circuit for performing a carry in a system utilizing look up tables.

2. Description of the Related Art

Circuitry for providing a carry operation when look up tables are used to perform an addition or subtraction operation has typically taken one of two forms. In a first form, the look up tables are programmed to determine a carry out based at least on two data inputs and a carry input. In a second form, to increase operation speed over performing an entire operation using look up tables, dedicated logic is utilized to determine the carry instead of a look up table.

Figure 1:
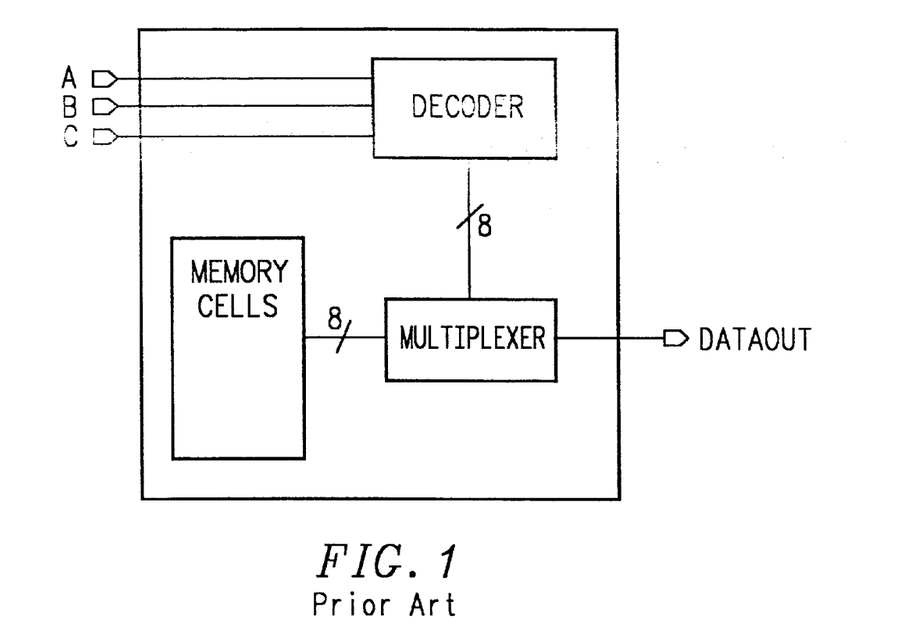
FIG. 1 shows a block diagram of components for a three input lookup table.
Figure 2:
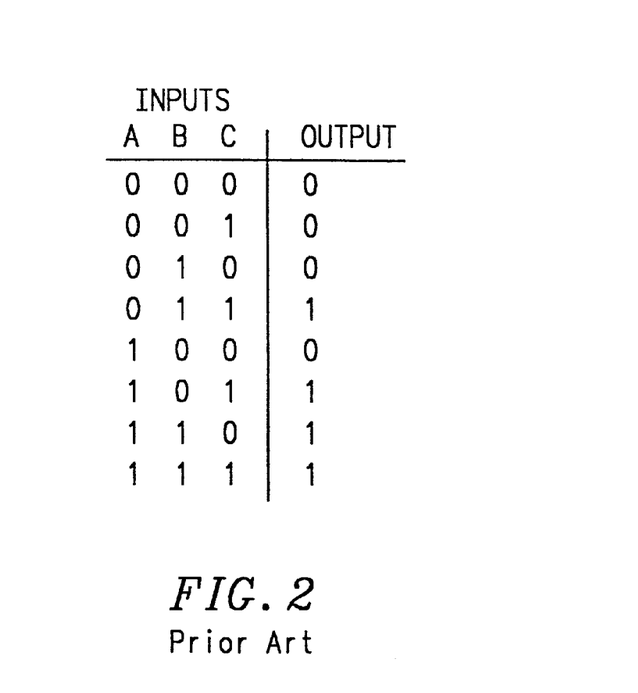
FIG. 2 is a table illustrating programming of the memory cells in the look up table of FIG. 1 to determine a carry in an addition operation.

To illustrate programming of look up tables to determine a carry, reference is made to FIG. 1 and FIG. 2. FIG. 1 shows a block diagram of components for a 3-input lookup table. The look up table of FIG. 1 includes a three input decoder, 8 memory cells and a multiplexer. The three input decoder decodes a signal provided to the look up table inputs to control the multiplexer so that only one of the memory cells provide a signal to the output. The memory cells can be programmed in any arbitrary manner to provide a desired look up table output based on inputs to the look up table.

FIG. 2 is a table illustrating programming of the memory cells in the look up table of FIG. 1 to determine a carry in an addition operation. In Table 2, it is assumed that A and B are binary numbers being added, and C is a carry in from a previous operation. The output then provides an indication of the carry out of the binary addition of A and B with the carry in C.

Figure 3:
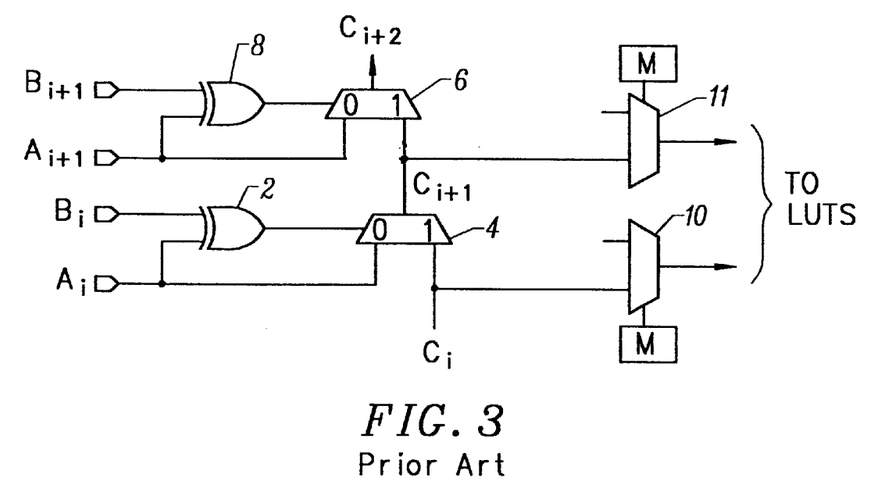
FIG. 3 illustrates typical dedicated carry logic utilized in conjunction with look up tables.

FIG. 3 illustrates typical dedicated carry logic utilized in conjunction with look up tables to free up the look up tables for purposes other than determining carries, and potentially speed up the carry operations. The logic includes an exclusive OR (XOR) gate 2 and a multiplexer 4. The XOR gate 2 receives signals representing two numbers to be added, $A_i$ and $B_i$. The multiplexer 4 has a select input connected to the XOR gate 2 output, a first input receiving the $A_i$ signal which is provided as the output of multiplexer 4 when select is 0, and a second input receiving a carry in $C_i$ signal which is provided as the output of multiplexer 4 when select is 1. The output of the multiplexer 4 then provides a carry out $C_{i+1}$ of the operation $A_i+B_i+C_i$.

Figure 4:
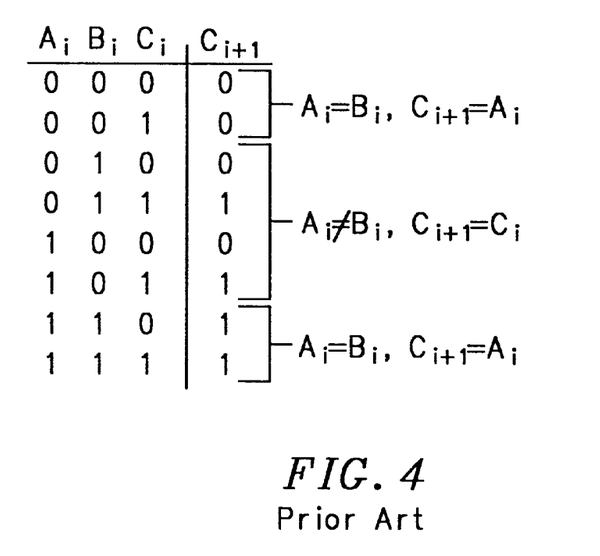
FIG. 4 is a table illustrating operation of circuitry in FIG. 3.

FIG. 4 provides a table illustrating operation of the XOR gate 2 and multiplexer 4 of FIG. 3. In FIG. 4, $A_i$ and $B_i$ inputs with the carry in, $C_i$, are followed by a carry out, $C_{i+1}$, which is the carry of the operation $A_i+B_i+C_i$. As shown, if $A_i=B_i$, $C_{i+1}$ is defined without reference to $C_i$, and is equal to either the $A_i$ or $B_i$ input. This operation is performed with the logic of FIG. 3, with $A_i$ being selected to provide the output of multiplexer 4, or $C_{i+1}$, by the XOR gate 2 only when $A_i=B_i$. As further shown in FIG. 4, if $A_i \ne B_i$, then $C_{i+1}=C_i$. This operation is performed with the logic of FIG. 3, with $C_i$ being selected as the output of multiplexer 4, or $C_{i+1}$, when $A_i \ne B_i$. In other words, in FIG. 3, $C_{i+1}$ is created by multiplexing between the $A_i$ input and $C_i$.

In FIG. 3, additional signals representing numbers $A_{i+1}$ and $B_{i+1}$ are added with a carry in provided by the output of multiplexer 4. The signals representing numbers $A_{i+1}$ and $B_{i+1}$ are provided to inputs of an additional XOR gate 8. The output of the XOR gate is provided to the select input of an additional multiplexer 6, while the output of multiplexer 4 provides one input to the multiplexer 6, and the signal representing the number $A_{i+1}$ provides another input to the multiplexer 6. The signal $A_{i+1}$ is provided as the multiplexer 6 output when select is 0, and the output of multiplexer 4 is provided as the multiplexer 6 output when select is 1. The output of the multiplexer 6 then provides a carry out $C_{i+2}$ of the operation $A_{i+1}+B_{i+1}+C_{i+1}$. Operation of XOR gate 8 with multiplexer 6 is similar to operation of XOR gate 2 with multiplexer 4 as described with reference to FIG. 4.

In FIG. 3, additional multiplexers 10–11 are further provided to selectively provide the carries $C_i$ and $C_{i+1}$ to look up tables for subsequent operations. Typical circuitry using look up tables with either dedicated carry logic as shown in FIG. 3, or look up tables configured to provide carry operations can be found in field programmable gate arrays (FPGAs).

SUMMARY OF THE INVENTION

The present invention provides a high speed carry operation with minimal circuitry by using look up tables in conjunction with dedicated logic provided after the look up tables.

The present invention configures the dedicated logic provided after the look up tables to be versatile so that in addition to providing a carry, the circuitry can provide the result of an addition or subtraction operation and can enable two 3-input look up tables to be combined to form a 4-input look up table. With such versatility, the circuitry of the present invention can be configured to provide an adder-subtractor, an up/down counter, an accumulator and a pre-loadable counter using 3-input or 4-input look up tables. If the 3-input look up tables are combined to form a 4-input look up table, then the carry logic can be used to implement a wide gate, such as an AND gate, which can AND the output of a large number of 4-input look up tables.

To provide a carry, the present invention includes a first multiplexer having a first input receiving a carry in C, a select input coupled to the output of a first 3-input look up table, and a second input coupled to the output of a second 3-input look up table. The two 3-input look up tables each receive two input signals A and B representing numbers to be added or subtracted and a third input signal ADD/SUB indicating if addition or subtraction is desired. The first look up table is programmed to provide A(+)B, while the second look up table is programmed to provide A*B, where (+) indicates a Boolean exclusive OR, and * indicates a Boolean AND. As configured, with addition selected using the ADD/SUB signal, the first multiplexer output provides the carry out of the operation A+B+C. With subtraction selected using the ADD/SUB signal, a 2's complement is provided with B complemented in the look up tables, so the output of the first multiplexer will provide the carry out of the operation A−B, with the carry in C considered.

To provide a result of an addition or subtraction, the present invention further includes a second multiplexer having a first input receiving the carry in C, a second input receiving the inverse of the carry in C, and a select input coupled to the output of the first look up table. The output of the second multiplexer provides a signal S which is the result of the addition or subtraction of A and B with the carry in C considered.

With addition and subtraction both being provided, a counter can be formed by registering an S output and feeding that back to its corresponding A input. By providing an appropriate B input, an up/down counter or a pre-loadable counter can be formed.

To selectively enable the two 3-input look up tables in a circuit to be combined to form a 4-input look up table, the present invention further includes a third multiplexer having a first input connected to the output of the first look up table, a second input coupled to the output of the second look up table, and an output connected to the select input of the first and second multiplexers. The output of the third multiplexer then provides the 4-input look up table output when the 4-input look up table is desired. The select input to the third multiplexer is provided by a NAND gate having one input receiving the fourth input (D), and a second input connected to a memory cell which enables selection of 3-input look up tables or a 4-input look up table. A NOR gate is further included having a first input connected to the output of the second look up table, a second input connected to the memory cell, and an output connected to the second input of the first multiplexer, the output of the first multiplexer providing the carry when configured for 3-inputs look up tables, or a wide gating function when 4-input look up tables are selected.

To maximize speed in providing a carry out, the output of the first multiplexer providing a carry out can be buffered by only one inverter. To account for each successive carry then being inverted, the present invention provides modifications to every other circuit providing a carry.

BRIEF DESCRIPTION OF THE DRAWINGS

Further details of the present invention are explained with the help of the attached drawings in which.

DETAILED DESCRIPTION

Figure 5:
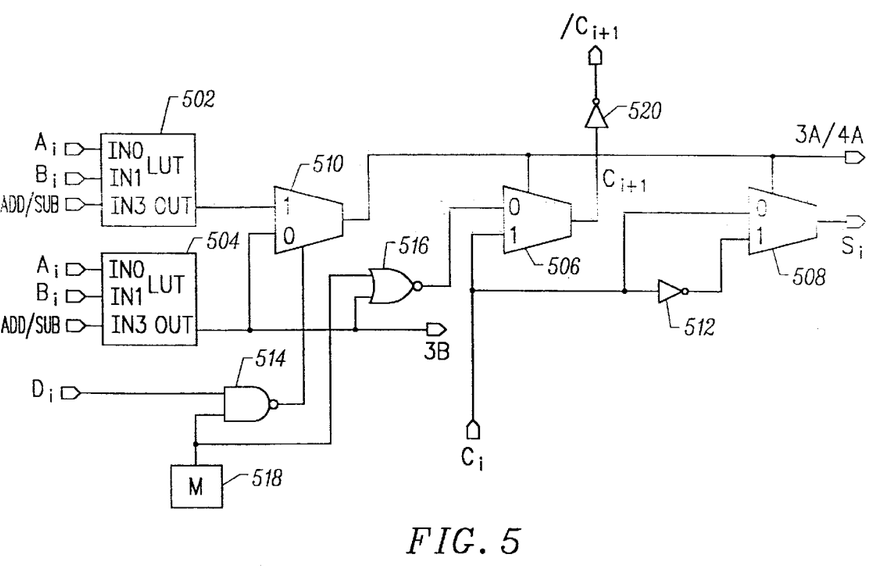
FIG. 5 shows circuitry of the present invention for providing a carry.

FIG. 5 shows circuitry of the present invention for providing a carry utilizing a combination of look up tables 502 and 504 and logic provided after the look up tables, rather than prior to the look up tables as shown in FIG. 3. With the look up tables and subsequent logic configured as shown in FIG. 5, the circuit of FIG. 5 can be configured to provide an adder, a subtractor, an up/down counter, a pre-loadable counter, or to provide a 4-input look up table from the two 3-input look up tables 502 and 504.

The look up tables 502 and 504 are 3-input look up tables with circuitry configured as shown in FIG. 1. Each look up table is shown receiving one input ADD/SUB indicating if the desired operation is addition or subtraction, and two additional inputs $A_i$ and $B_i$ representing two numbers which are to be used in the addition or subtraction operation. The ADD/SUB input is also used to function to control the look up table other than by indicating addition or subtraction, depending on the configuration of the circuit of FIG. 5 as described in more detail subsequently. An output of look up table 502 is connected to an input of a multiplexer 510 so that when the select signal provided to multiplexer 510 is 1, the signal from look up table 502 will be provided at the output of multiplexer 510. The output of look up table 504 is connected to another input of multiplexer 510 so that when the select signal provided to multiplexer 510 is 0, the signal from look up table 504 will be provided at the output of multiplexer 510. The output of look up table 504 is further provided to a node 3B, and to a first input of a NOR gate 516.

An additional input $D_i$ is provided to the circuit of FIG. 5 as a fourth input which is utilized when the circuit of FIG. 5 is configured to operate as a four input look up table. The input $D_i$ provides a first input to NAND gate 514 which has an output providing the select input of multiplexer 510.

A memory cell or fuse 518 provides a second input to NAND gate 514. The memory cell 518 is further connected to a second input of NOR gate 516. The memory cell is controlled to select if the output of look up tables 502 and 504 are to be provided separately, or if look up tables 502 and 504 are to be combined to form a larger 4-input look up table. For providing the outputs of look up tables 502 and 504 separately, the memory cell 518 stores a 0, so the output of multiplexer 510 will provide the signal from the output of look up table 502, irrespective of the state of $D_i$. Further, with a 0 stored in memory cell 518, NOR gate 516 will transition dependent on the output of look up table 504. To provide a four input look up table, the memory cell 518 stores a 1, so the output of multiplexer 510 provides the output of one of look up tables 502 and 504 dependent upon the state of the signal $D_i$. Further, with 1 stored in memory cell 518, the output of NOR gate 516 will not be controlled by look up table 504, it will always be 0.

The output of multiplexer 510 provides the select input to multiplexers 506 and 508. The output of multiplexer 510 also provides a signal to node 3A/4A. Nodes 3A/4A and 3B provide outputs of the 3 input look up tables 502 and 504 when the look up tables 502 and 504 operate separately, while node 3A/4A provides the output when the look up tables 502 and 504 are configured to provide a 4-input look up table.

A carry in $C_i$ is provided to a first input of multiplexer 506, while the output of NOR gate 516 is provided to a second input. The multiplexer 506 provides the carry in $C_i$ to its output as a signal $C_{i+1}$ when its select signal is 1. The multiplexer 506 further provides the output of NOR gate 516 as a signal $C_{i+1}$ when its select signal is 0. The output of multiplexer 506 is provided through a single inverter 520 to provide a carry out $/C_{i+1}$ to a subsequent circuit.

The carry in $C_i$ is also provided directly to a first input of multiplexer 508 and through an inverter 512 to a second input of the multiplexer 508. The multiplexer 508 provides the output of inverter 512 as a signal $S_i$ when its select signal is 1, and further provides the signal $C_i$ as the signal $S_i$ when its select signal is 0.

Operation of the circuit of FIG. 5 to provide an adder, a subtractor, an up/down counter, a pre-loadable counter, or to provide a 4-input look up table from the two 3-input look up tables 502 and 504 is described below.

Adder

For the circuit of FIG. 5 to form an adder, $A_i$ and $B_i$ form the two addends and $C_i$ the carry input. With 3-input look up tables desired, the memory cell 518 will store a 0 so that the signal $D_i$ will not affect the output state of NAND gate 514. Further, the output of look up table 504 can transition the output of NOR gate 516. The value of the ADD/SUB input to the look up tables 502 and 504 is set in a state indicating addition. The look up tables 502 and 504 are programmed to enable calculation of a sum $S_i$ and a carry out $C_{i+1}$.

For any adder having inputs $A_i$ and $B_i$ and a carry $C_i$, the sum $S_i$ and the carry out $C_{i+1}$ of addition of $A_i$, $B_i$, and $C_i$ can be defined as follows:

$$S_i = (A_i(+)B_i)^*/C_i + /(A_i(+)B_i)^*C_i \quad (1)$$

$$C_{i+1} = (A_i(+)B_i)^*C_i + /(A_i(+)B_i)^*(A_i^*B_i) \quad (2)$$

wherein:
(+) indicates a Boolean XOR operation;
+ indicates a Boolean OR operation;
* indicates a Boolean AND operation; and
/ indicates a Boolean NOT.

The look up tables 502 and 504 are programmed following equations (1) and (2) so that the output of multiplexer 506 provides a determination for $C_{i+1}$ and the output of multiplexer 508 provides a determination for $S_i$. Look up table 502 is programmed to generate $A_i(+)B_i$. Look up table 504 is programmed to generate $/(A_i^*B_i)$.

As configured, with 3-input look up tables desired, the memory cell 518 stores a 0 and the output of NAND gate 514 will be high causing multiplexer 510 to pass the output of look up table 502 to control multiplexers 506 and 508. Multiplexer 506 will, thus, pass $C_i$ if $A_i(+)B_i$ is true to generate the first term $(A_i(+)B_i)^*C_i$ for the carry $C_{i+1}$ of equation (2). Multiplexer 506 will alternatively pass the output of look up table 504 inverted by NOR gate 516, $(A_i^*B_i)$, if $A_i(+)B_i$ is false to generate the second term $/(A_i(+)B_i)^*(A_i^*B_i)$ for the carry $C_{i+1}$ of equation (2). Multiplexer 508 will pass $/C_i$ or $C_i$ depending upon whether $A_i(+)B_i$ is true or false respectively to generate the term $S_i$ of equation (1).

Note that equation (2) for $C_{i+1}$ can be altered slightly with recognition that when $/(A_i(+)B_i)$ is true, both $A_i$ and $B_i$ are the same. The equation for $C_{i+1}$ can be rewritten as follows:

$$C_{i+1} = (A_i(+)B_i)^*C_i + /(A_i(+)B_i)^*(A_i) \quad (3)$$

Considering equation (3), the circuit of FIG. 5 can be configured to operate as an adder by programming look up table 504 to provide $/A_i$ or $/B_i$ input at its output rather than providing the operation $/(A_i^*B_i)$.

Circuit For Multiple Carries

Figure 6:
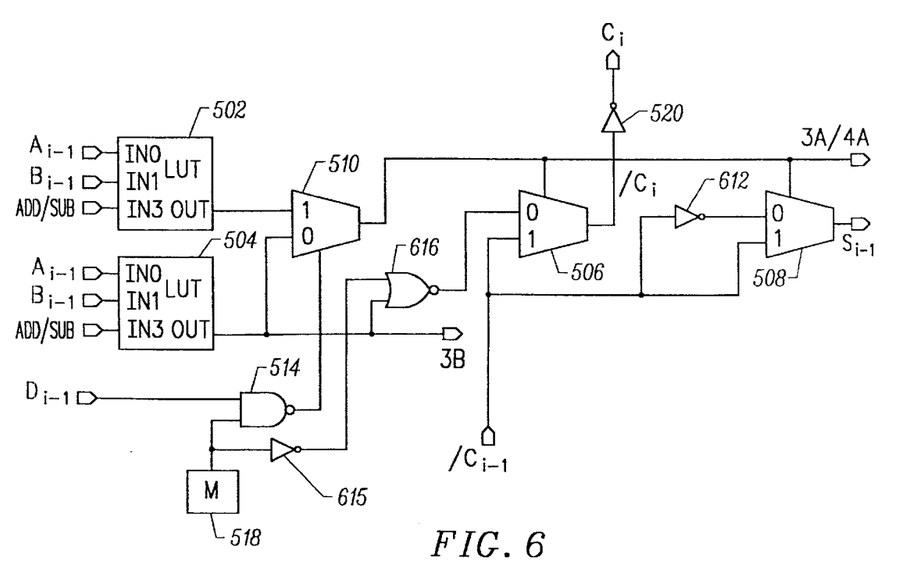
FIG. 6 shows modifications to the circuit of FIG. 5 to provide a circuit utilized in conjunction with the circuit of FIG. 5 for multiple carries.

FIG. 6 shows modifications to the circuit of FIG. 5 to provide a circuit utilized in conjunction with the circuit of FIG. 5 when operations are performed requiring multiple carries. With multiple carries, the circuit of FIG. 6 is utilized to provide every other carry while the circuit of FIG. 5 is utilized for the remaining carries. Circuitry carried over from FIG. 5 to FIG. 6 is labeled with similar reference numbers, as will be circuitry carried over in subsequent drawings.

The circuit of FIG. 6 differs from that of FIG. 5 to enable the carry to be provided from each of FIGS. 5 and 6 with only one gate delay. The gate delay in the circuits of FIGS. 5 and 6 is provided by inverter 520. With only one inversion, a carry out will be inverted relative to a carry in necessitating a slightly different circuit in FIG. 6 relative to FIG. 5.

Figure 7:
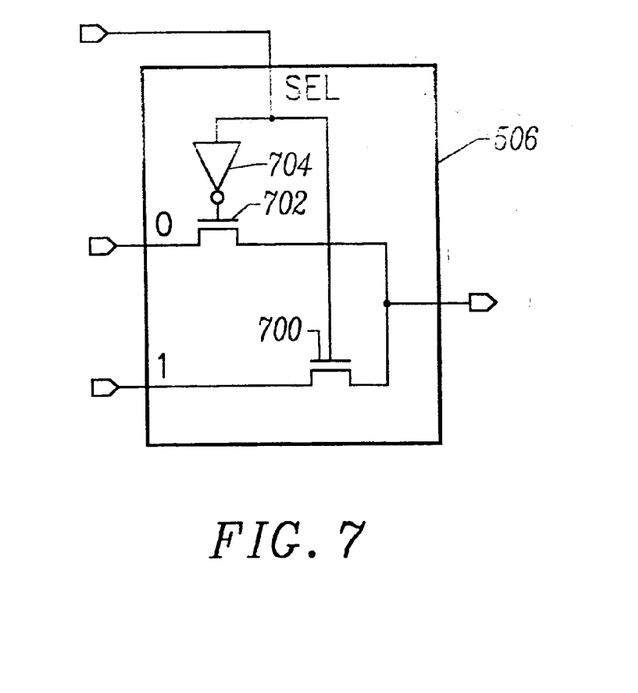
FIG. 7 shows circuitry utilized in the multiplexer providing the carry of FIGS. 5 and 6.

At least one inverter, such as 520, is needed between the output of multiplexer 506 and subsequent circuitry. FIG. 7 shows one embodiment of circuitry included in multiplexer 506 of both FIGS. 5 and 6. As shown, the multiplexer 506 includes two pass gates 700 and 702 having source to drain paths each connecting a separate input to the multiplexer 506 output. A select input is provided directly to the gate of transistor 700, and through an inverter 704 to the gate of transistor 702. As configured, when a 1 is provided to the select input, pass gate 800 will turn on and pass gate 702 will turn off. When a 0 is provided to the select input, pass gate 702 will turn on and pass gate 702 will turn off.

With circuitry for a multiplexer 506 as shown in FIG. 7, when several such multiplexers are connected in series, buffering between the multiplexers is desirable. A pass gate of the multiplexer 506 will provide capacitance and resistance to a signal, while wiring connecting the pass gate to other components provides a small capacitance to create an RC delay. With several multiplexers 506 connected in series and no buffering, the RC delay will become significant and slow down circuit operation to an undesirable level. An inverter provided between each multiplexer will provide a delay on the order of 150 ps, and provide a high impedance to a signal driving the inverter. The inverter has a high impedance input and a low impedance output. The high impedance input provided by the inverter, will counteract the effect of the resistance of the pass gate so that RC delay through each multiplexer will be minimal. The 150 ps delay of each inverter provided with a multiplexer will be significantly less than RC delay resulting if the inverters are not used when several multiplexers are connected in series.

Utilizing two inverters to provide such buffering would prevent a carry out from being inverted relative to a carry in. However, such an additional inverter would also increase delay to 300 ps for each multiplexer and two connecting inverters. Such an additional inverter is not utilized in FIGS. 5 and 6 because the additional speed obtained in providing the carry without an additional gate delay is highly desirable.

Figure 8:
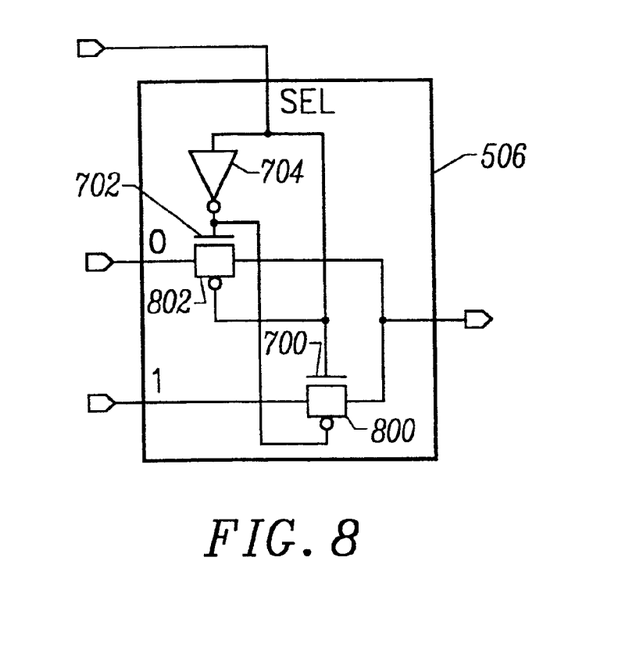
FIG. 8 shows modifications to the circuit of FIG. 7 for use with a low voltage device.

FIG. 8 shows modifications to the circuit of FIG. 7 for a low voltage device wherein a high is on the order of 2.5 volts. As shown, the circuit of FIG. 8 is modified to include a PMOS pass gate 800 with a source to drain path connected in series with the NMOS pass gate 700, and a PMOS pass gate 802 having a source to drain path connected in series with the NMOS pass gate 702. The gate of transistor 800 is connected to the output of inverter 704, while the gate of transistor 802 is connected to the input of inverter 704. The CMOS pass gates 800 and 802 function to provide a source to drain voltage without a 0.7 volt drop suffered by NMOS transistors when a signal provided through the pass gates 800 and 802 is high. With a low voltage device, such a 0.7 volt drop could cause power dissipation in the next CMOS stage following the multiplexer because a PMOS transistor in the next CMOS stage would not completely turn off. In a 5.0 volt technology device, the PMOS transistors in a next stage could be forced to turn off by providing special implants to the PMOS transistor to lower its threshold. However, in a low voltage device, reduction of the threshold of the PMOS transistor would not be practical because the threshold would reduce current flow through the PMOS transistor to an unacceptable level. The NMOS transistors 700 and 702 are utilized in combination with the PMOS transistors 800 and 802 because the NMOS transistors provide a faster transition when their source to drain voltages switch from a low to a high.

The circuit of FIG. 6 is shown with inputs and outputs labeled assuming that the circuit of FIG. 6 is connected to provide the carry in $C_i$ to the circuit of FIG. 5. As shown, the look up tables 502 and 504 of FIG. 6 receive inputs $A_{i-1}$ and $B_{i-1}$, representing less significant bits than $A_i$ and $B_i$ in FIG. 5 of a number to be added or subtracted as controlled by the ADD/SUB signal. An additional input $D_{i-1}$ is received at an input of NAND gate 514 which is a less significant bit than $D_i$, received by the NAND gate 514 of FIG. 5. A carry in $/C_{i-1}$ which is the inverse of a carry prior to the carry out $C_i$, the carry in to FIG. 6 being inverted because only one inversion is provided in the carry path by inverter 520 to provide the carry out $C_i$ as described above. The output of multiplexer 508 provides a bit $S_{i-1}$ representing a less significant bit of a number than $S_i$ of FIG. 5.

Circuitry in FIG. 6 first differs from the circuit of FIG. 5 with the inverter 512 being replaced by a direct connection, and an inverter 612 replacing the direct connection from the carry in to the 0 input of multiplexer 508. Such connections to multiplexer 508 are made because the carry in $/C_{i-1}$ is inverted in FIG. 6 relative to the carry in $C_i$ for FIG. 5.

The circuit of FIG. 6 is further modified relative to the circuitry of FIG. 5 by replacing the NOR gate 516 with a NAND gate 616 and connecting the memory cell to an input of the NAND gate 616 using an inverter 615. With the memory cell storing a 0 to select a 3-input look up table operation mode, the NAND gate 616 will function the same as NOR gate 516 to invert the signal from look up table 504 provided to multiplexer 506. However, when the memory cell stores a 1 to select a 4-input look up table operation mode, as described in more detail below, the NAND gate 616 will provide a 1 to multiplexer 506, while NOR gate 516 provides a 0. The NAND gate 616 and NOR gate 516 provide opposite output states in a 4-input operation mode due to the carry being inverted from one stage relative to another, as described in more detail subsequently.

When circuits, such as those in FIGS. 5 and 6 are connected together to provide multiple carries, the initial carry in to the first circuit can be provided using a circuit as shown in FIG. 5 or FIG. 6. Assuming a circuit configured as shown in FIG. 5 is used to provide the initial carry in, the circuit can be configured by storing a 1 in memory cell 518 to select a 3-input look up table mode so that only the output of look up table 502 is provided through multiplexer 510. The look up table 502 is then programmed to provide a 0 at its output so that only the output of look up table 504 will control the state of the output of the carry out $C_{i+1}$ of multiplexer 506. The look up table 504 is then programmed to provide the desired state of the carry $C_{i+1}$, and thus the desired state of the initial carry $/C_{i+1}$ from inverter 520.

Addition With Multiple Carries

To perform addition with multiple carries when 3-input look up tables are desired, the circuits of FIGS. 5 and 6 are connected together. The circuit of FIG. 5 is configured as described above to provide addition. In the circuit of FIG. 6, the look up table 502 is configured to generate $A_{i-1}(+)B_{i-1}$, similar to FIG. 5. Look up table 504 in FIG. 6 is configured to generate $(A_{i-1}*B_{i-1})$, rather than its inverse as in FIG. 5, because the carry provided from multiplexer 506 is inverted relative to the carry out of multiplexer 506 in FIG. 5. The memory cell 518 will store a 0 in FIG. 6, with 3-input look up tables desired, so the output of multiplexer 510 will pass the output of look up table 502 to control multiplexers 506 and 508. Referring to equation (2), multiplexer 506 will, thus, provide the carry in signal $/C_{i-1}$ if $A_{i-1}(+)B_{i-1}$ is true to generate the first term of equation (2), while alternatively passing the output $/(A_{i-1}*B_{i-1})$ of look up table 504 as provided through NAND gate 616 to generate the second term of equation (2) when $A_{i-1}(+)B_{i-1}$ is false. The term $/C_i$ will then be provided from the output of multiplexer 506 to generate the term $C_i$ at the output of inverter 520. Multiplexer 508 will pass $/C_{i-1}$ or $C_{i-1}$ depending on whether $A_{i-1}(+)B_{i-1}$ is true or false to generate the term $S_{i-1}$ following equation (1).

Subtraction

Subtraction is selected using the ADD/SUB signal provided to an input of the 3-input look up tables of FIG. 5 as well as FIG. 6. Subtraction is provided with the circuits of FIGS. 5 and 6 using a 2's complement procedure. For subtraction, the look up tables of FIGS. 5 and 6 are programmed to provide operations described above for addition.

In the look up tables of FIGS. 5 and 6 when subtraction is selected, the 1's complement of the B addend is taken in the look up tables, wherein B represents a numbers having components $B_i$ and $B_{i-1}$. The 1's complement is taken in the look up tables before the operations, $A_i(+)B_i$ etc., described above for addition, are further performed in the look up tables. To complete a 2's complement operation, a 1 is provided as a carry in to the first stage to provide a 2's complement of B. With subtraction so provided, decrementing of A can be provided by setting B to 1, a carry in to 1, and ADD/SUB to indicate subtraction.

Up/Down Counter & Accumulator

Figure 9:
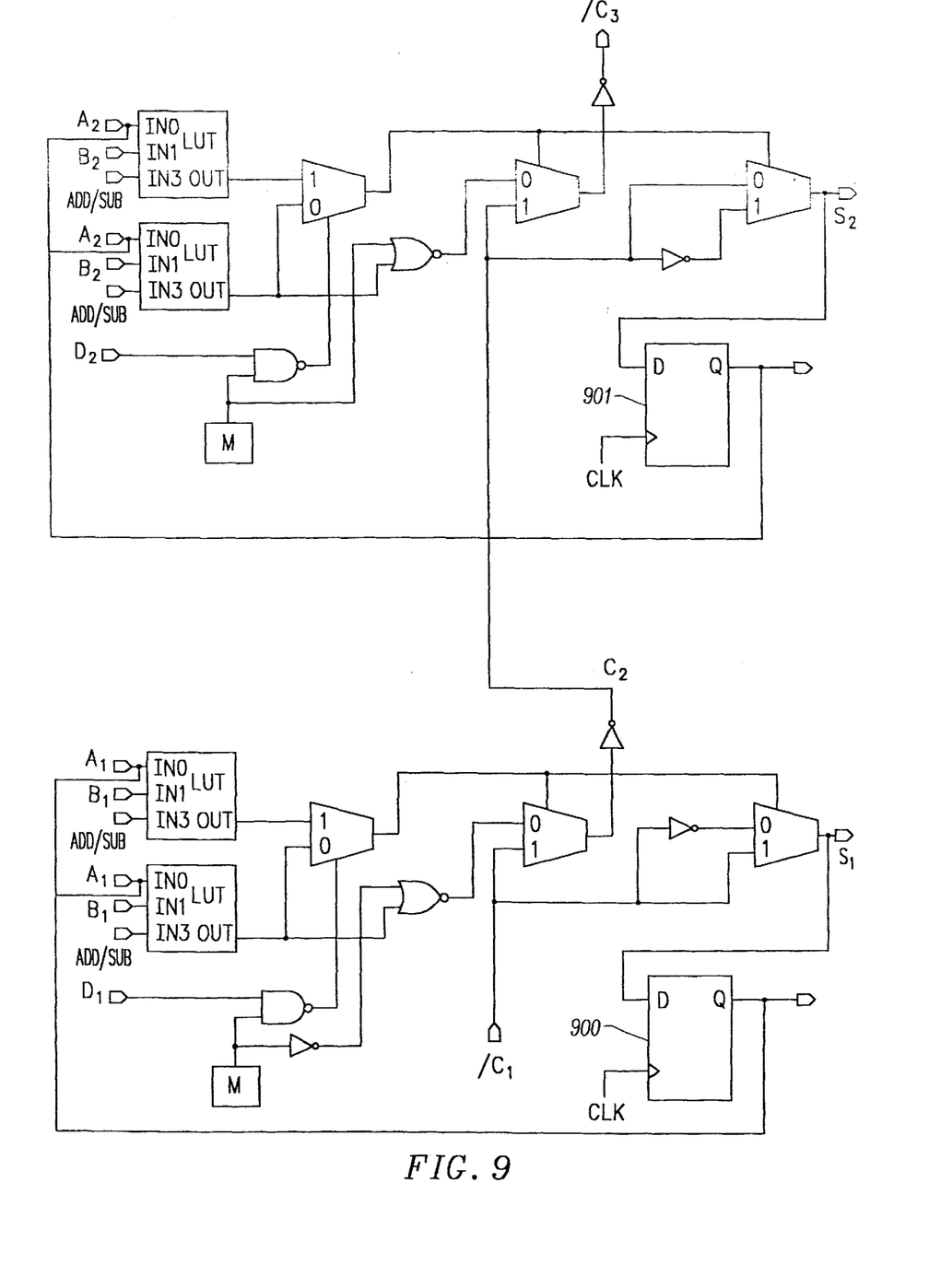
FIG. 9 shows modifications to the circuits of FIGS. 5 and 6 to enable forming an up/down counter and a pre-loadable counter.

An up/down counter is created by first connecting each $A_i$ input to its corresponding $S_i$ output via a register, as illustrated in FIG. 9.

For the up counter, the $B_i$ input is set to zero the carry in is set to 1, and ADD/SUB is set to addition. Operation for a two bit up counter is described with respect to Table A below. Table A shows the states of $S_i$ outputs, $S_1$ and $S_2$, after each clock cycle is provided to the registers 900 and 901.

TABLE A

|         | $S_1$ | $S_2$ |
|---------|-------|-------|
| State 1 | 0     | 0     |
| State 2 | 1     | 0     |
| State 3 | 0     | 1     |
| State 4 | 1     | 1     |

For up counting with an initial state $A_i=S_i=(0\ 0)$, $B_i=(0\ 0)$ and a carry in 1, the signal $S_i$ for State 2 will be $S_i=(1\ 0)$ after the clock transitions. Further, in State 2 with the carry in remaining 1 and $A_i=S_i=(1\ 0)$, after the clock transitions, for State 3 $S_1$ will transition to 0, while $S_2$ receives a carry from the operation for $S_1$ and will transition to 1 making $S_i=(0\ 1)$. Similar operations occur to provide the remaining state.

For down counting, $B_i$ can be set to zero, the carry in set to 0, and ADD/SUB set to subtraction. Operation for a two bit down counter is described with respect to Table B below. Table B shows the states of $S_i$ outputs, $S_1$ and $S_2$, after each clock cycle is provided to the registers 900 and 901.

TABLE B

|         | $S_1$ | $S_2$ |
|---------|-------|-------|
| State 1 | 0     | 0     |
| State 2 | 1     | 1     |
| State 3 | 0     | 1     |
| State 4 | 1     | 0     |

For down counting with an initial state $A_i=S_i=(0\ 0)$, $B_i=(0\ 0)$ and a carry in of 0, the signal $S_i$ for State 2 will be $S_i=(1\ 1)$ after the clock transitions. Further, in State 2 with the carry in remaining 0, $B_i$ remaining (0,0) and $A_i=S_i=(1\ 1)$, after the clock transitions, for State 3 $S_1$ will transition to 0, while $S_2$, receiving a carry from the operation for $S_1$, will remain 1, making $S_i=(0\ 1)$. Similar operations occur to provide the remaining state.

To provide an accumulator, the $B_i$ input is set to any desired value, and the configuration for the up or down counter described above is otherwise followed. The output of the register feeding back the $S_i$ output to the $A_i$ input will also provide the output of the accumulator.

Pre-loadable Counter

To create a pre-loadable counter, similar to the up/down counter, each $A_i$ input is connected to its corresponding $S_i$ output via a register, as shown in FIG. 9. The $B_i$ input is used to preload data. The input labeled ADD/SUB is now used for a count/preload input. The look up tables are reprogrammed so that when the count/preload input is 0, the $A_i$ input is added to 0, and when the count/preload is 1, $A_i$ is added to $B_i$. Otherwise, the look up tables are programmed as indicated above for an addition operation. Prior to preloading, the register outputs can be reset so that the $A_i$ inputs will all be 0 when $B_i$ is loaded.

4-Input Look Up Table & Wide Gating

To configure of the circuit of either FIG. 5 or FIG. 6 to provide a 4-input look up table, the memory cell 518 is set to store a 1. With the circuit of FIGS. 5 and 6 connected together and their memory cells 518 storing a 1, wide gating may also be provided using the carry chain, as described in more detail below. With the memory cell 518 storing a 1, $A_i$, $B_i$, ADD/SUB and $D_i$ provide the inputs, while 3A/4A will provide the output.

With the memory cells 518 storing a 1 to select a 4-input look up table mode, NAND gate 514 in FIGS. 5 and 6 will provide a high output when $D_i$ is low, and a low output when $D_i$ is high. Thus, the inverse of the signal $D_i$ is provided to the select input of multiplexer 510. When $D_i$ is low, the output of look up table 502 will then be provided through multiplexer 510 to node 3A/4A. When $D_i$ is high, the output of look up table 504 will be provided through multiplexer 510 to node 3A/4A.

With the memory cells 518 providing a 1 and multiple circuits, such as those of FIGS. 5 and 6 chained together, the carris can be sed to provide wide gating. ith memory cell 518 of FIG. 5 storing a 1 the output of NOR gate 516 in FIG. 5 only provides a 0 to multiplexer 506 which controls the carry. Further, memory cell 518 providing a 1 in FIG. 6 assures that the output of NAND gate 616 in FIG. 6 only provides a 1 to its multiplexer 506 which also controls the carry. Thus, with wide gating selected, the last carry out $C_{i+n}$ will be true, or a 1, if and only if the initial carry in is a 1 and if the output of every 4-input look up table in the chain is a 1. Note when Ci is true, or a 1, /Ci is 0.

Such wide gating can be used to form circuits such as a large, or wide, AND gate. To create the large AND gate, the 4-input look up tables are each programmed to form a 4-input AND gate. With the initial carry in appropriately set to 1, the last carry out $C_{i+1}$ will only be a 1 when the output of every 4-input look up table is high. Thus, the last carry out $C_{i+n}$ functions to provide the output of a large AND gate by acting as if it provided the output of another AND gate having inputs receiving the outputs of the AND gates formed by the 4-input look up tables.

With the memory cell 518 storing a 0 so that a 4-input look up table and wide gating are not selected, the outputs of look up tables 502 and 504 are provided individually to respective nodes 3A/4A and 3B. With the memory cell output being a 0, the output of NAND gate 514 will remain high, enabling only the output of look up table 502 to be provided through multiplexer 510 to node 3A/4A. By being versatile to provide multiple functions such as 3 and 4 input look up tables, an adder, a subtractor, and a counter, the circuit of the present invention, such as shown in FIG. 5 is ideal for including in a field programmable gate array (FPGA).

If selection of a 4-input look up table is not desired, the circuit of FIGS. 5 and 6 can be modified slightly to eliminate unnecessary circuitry. To eliminate the 4-input look up table mode, for the circuit of FIG. 5, the memory cell 518, NAND gate 514, NOR gate 516 and multiplexer 510 will be removed. For the circuit of FIG. 6, the memory cell 518, NAND gate 514, inverter 615, NAND gate 616 and multiplexer 510 will be removed. For both FIGS. 5 and 6 a direct connection is then made from the output of look up table 502 to the select inputs of multiplexer 506 and 508. Further, a direct connection is made from the output of look up table 504 to the 0 input of multiplexer 506. Because no inversion is provided between the output of look up table 504 and multiplexer 506, (A*B) will be programmed in the look up table 504 of FIG. 5 rather than /(A*B) for operations described above. Further, /(A*B) will be programmed in the look up table 504 of FIG. 6 rather than (A*B) for operations described above. Further, the look up table 504 might be removed, and with the look up table 504 removed a programmable inversion will not be required from the $B_i$ input to the input 0 of multiplexer 506 for operations such as addition and subtraction using FIG. 5 as discussed above.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A circuit for providing a carry operation comprising:
 a first multiplexer having a first input for receiving a carry in (C), a second input, and a select input, and an output, the first multiplexer comprising:
  a first transistor having a source to drain path coupling the first input of the first multiplexer to the output of the first multiplexer, and having a gate coupled to the select input of the first multiplexer;
  a second transistor having a source to drain path coupling the second input of the first multiplexer to the output of the first multiplexer, and having a gate; and
  a first inverter coupling the select input of the first multiplexer to the gate of the second transistor;
 a first look up table having a first input for receiving a first signal (A), a second input for receiving a second signal (B) and an output coupled to the select input of the first multiplexer, the first look up table for performing an operation using the first signal (A) and the second signal (B) requiring use of the carry (C);
 a second multiplexer having a carry input for receiving an inverse of the carry in (C); and
 a second inverter coupling the output of the first multiplexer to a carry input of the second multiplexer,
 wherein no logic gate is provided between the source to drain paths of the first and second transistors of the first multiplexer and the carry input of the second multiplexer other than the second inverter.

2. The circuit of claim 1 further comprising:
 a second look up table having a first input for receiving the first signal (A), a second input for receiving the second signal (B) and an output coupled to the second input of the first multiplexer.

3. The circuit of claim 2, wherein the first look up table has a third input for receiving a third signal (ADD/SUB), wherein when the third signal indicates subtraction is desired, the second signal B is complemented before the first look up table performs an operation A(+)B, where (+) designates a Boolean exclusive OR operation, and when the third signal indicates addition is desired the second signal B is not complemented before the first look up table performs the operation A(+)B, and wherein the second look up table has a third input for receiving the third signal (ADD/SUB), wherein when the third signal indicates subtraction is desired, the second signal B is complemented before the first look up table performs an operation A*B, wherein * designates a Boolean AND operation, and when the third signal indicates addition is desired the second signal B is not complemented before the first look up table performs the operation A*B.

4. The circuit of claim 1, wherein the second input of the first multiplexer receives the second signal (B).

5. The circuit of claim 1, wherein the first transistor and second transistors are NMOS transistors, the circuit further comprising:

a third transistor having a source to drain path coupling the first input of the first multiplexer to the output of the first multiplexer, and having a gate coupled to the output of the first inverter; and a fourth transistor having a source to drain path coupling the second input of the first multiplexer to the output of the first multiplexer, and having a gate coupled to the select input of the first multiplexer.

6. A circuit for providing a carry operation comprising:

a first multiplexer having a first input for receiving a carry in (C), a second input, and a select input, the first multiplexer comprising:

a first transistor having a source to drain path coupling the first input of the first multiplexer to the output of the first multiplexer, and having a gate coupled to the select input of the first multiplexer;

a second transistor having a source to drain path coupling the second input of the first multiplexer to the output of the first multiplexer, and having a gate; and a first inverter coupling the select input of the first multiplexer to the gate of the second transistor;

a first look up table having a first input for receiving a first signal (A), a second input for receiving a second signal (B) and an output coupled to the select input of the first multiplexer;

a second multiplexer having a first input for receiving the carry in (C), a second input coupled for receiving an inverse of the carry in, a select input coupled to the output of the first look up table, and an output providing a sum (S); and a second inverter coupling the output of the first multiplexer to a carry input of the second multiplexer.

7. A circuit for providing a carry operation comprising:

a first look up table having a first input for receiving a first signal (A), a second input for receiving a second signal (B) and an output;

a second look up table having a first input for receiving the first signal (A), a second input for receiving the second signal (B) and an output;

a first multiplexer having a first input coupled to the output of the first look up table, a second input coupled to the output of the second look up table, and a select input;

a first gate having a first input for receiving a third signal (D), a second input for receiving an enable signal (f) and an output coupled to the select input of the first multiplexer, the first gate functioning to provide the third signal D to the select input of the third first multiplexer when the enable signal (f) is active, and to not provide the third signal D to the select input of the first multiplexer when the enable signal is inactive; and a second multiplexer having a first input for receiving a carry in (C), a second input coupled to the output of the second look up table, a select input coupled to the output of the first look up table, and an output coupled for providing a carry out.

8. The circuit of claim 7 further comprising:

an inverter coupling the output of the second multiplexer to a carry input to an additional multiplexer without providing a gate delay separate from a gate delay of the inverter.

9. The circuit of claim 7, wherein the first look up table is programmed to provide a signal at its output indicating a result of an operation A(+)B, where (+) indicates a Boolean exclusive OR operation.

10. The circuit of claim 9, wherein the second look up table is programmed to provide a signal at its output indicating a result of an operation A*B, where * indicates a Boolean AND operation.

11. The circuit of claim 10, wherein the first look up table has a third input for receiving a third signal (ADD/SUB), wherein when the third signal indicates subtraction is desired, the first look up table performs the operation A(+)/B, and when the third signal indicates addition is desired the first look up table performs the operation A(+)B, and wherein the second up table has a third input for receiving the third signal (ADD/SUB), wherein when the third signal indicates subtraction is desired, the second look up table performs the operation /(A*B), and when the third signal indicates addition is desired the second look up table performs the operation A*B.

12. The circuit of claim 9, wherein the second look up table is programmed to provide the first signal A at its output.

13. The circuit of claim 9, wherein the first look up table has a third input for receiving a third signal (ADD/SUB), wherein when the third signal indicates subtraction is desired, the second signal B is complemented before the first look up table performs the operation A(+)B, and when the third signal indicates addition is desired the second signal B is not complemented before the first look up table performs the operation A(+)B.

14. The circuit of claim 7, further comprising:

a second gate having a first input to output path coupling the output of the second look up table to the second input of the second multiplexer, and a second input for receiving the enable signal (f), the second gate functioning to provide the output of the second look up table to the second input of the first multiplexer when the enable signal (f) is active, and to not provide the output of the second look up table to the second input of the first multiplexer when the enable signal (f) is active.

15. The circuit of claim 14, wherein the first gate is a NAND gate and the second gate is a NOR gate.

16. The circuit of claim 14, wherein the first gate is a NAND gate and the second gate is a NAND gate and the enable signal (f) is provided to the second input of the second gate through an inverter.

17. The circuit of claim 14 further comprising:

a third multiplexer having a first input for receiving the carry in (C), a second input coupled for receiving an inverse of the carry in, a select input coupled to the output of the first multiplexer, and an output providing a sum (S).

18. The circuit of claim 17 further comprising:

a register having an input coupled to the output of the third multiplexer and an output coupled to the first input of the first look up table and to the first input of the second look up table.

19. A circuit for providing a carry operation comprising:

a first look up table having a first input for receiving a first signal (A), a second input for receiving a second signal (B) and an output;

a second look up table having a first input for receiving the first signal (A), a second input for receiving the second signal (B) and an output;

a first multiplexer having a first input for receiving a carry in (C), a second input coupled to the output of the second look up table, a select input coupled to the output of the first look up table, and an output coupled for providing a carry out; and a second multiplexer having a first input for receiving the carry in (C), a second input coupled for receiving an inverse of the carry in, a select input coupled to the output of the first look up table, and an output providing a sum (S).

20. The circuit of claim 19 further comprising:

a register having an input coupled to the output of the second multiplexer and an output coupled to the first input of the first look up table and to the first input of the second look up table.

21. A circuit for providing a carry operation comprising:

a look up table having a first input for receiving a first signal (A), a second input for receiving a second signal (B) and an output;

a first multiplexer having a first input for receiving a carry in (C), a second input coupled to receive the firs signal A, a select input coupled to the output of the look up table, and an output coupled for providing a carry out; and a second multiplexer having a first input for receiving the carry in (C), a second input coupled for receiving an inverse of the carry in, a select input coupled to the output of the look up table, and an output providing a sum (S).

22. The circuit of claim 21, wherein the look up table is programmed to provide a signal at its output indicating a result of an operation A(+)B, where (+) indicates a Boolean exclusive OR operation.

23. The circuit of claim 22, wherein the look up table has a third input for receiving a third signal (ADD/SUB), wherein when the third signal indicates subtraction is desired, the second signal B is complemented before the look up table performs the operation A(+)B, and when the third signal indicates addition is desired the second signal B is not complemented before the look up table performs the operation A(+)B.

\* \* \* \* \*

UNITED STATES PATENT AND TRADEMARK OFFICE
CERTIFICATE OF CORRECTION

PATENT NO.   : 6,359,466 B1
DATED        : March 19, 2002
INVENTOR(S)  : Sharpe-Geisler It is certified that error appears in the above-identified patent and that said Letters Patent is hereby corrected as shown below:

Column 14,
Line 11, "firs signal" should be -- first signal --.

Signed and Sealed this

Twenty-first Day of January, 2003

JAMES E. ROGAN
*Director of the United States Patent and Trademark Office*